Nov. 7, 1950        T. J. SMULSKI        2,528,979
ADJUSTABLE LENGTH WINDSHIELD WIPER ARMS
Original Filed Feb. 11, 1944        2 Sheets-Sheet 1
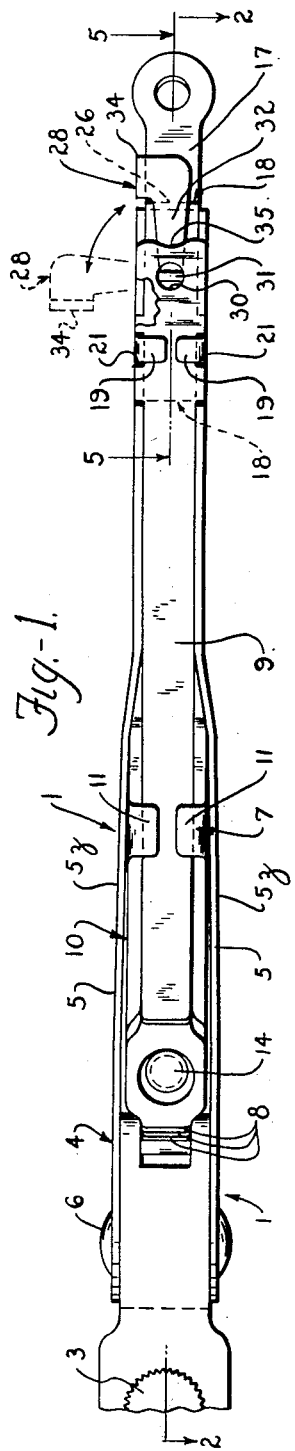
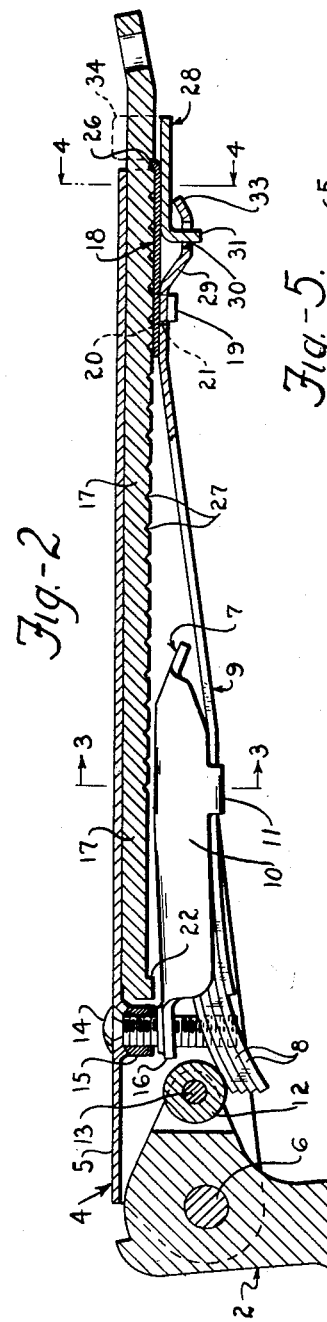
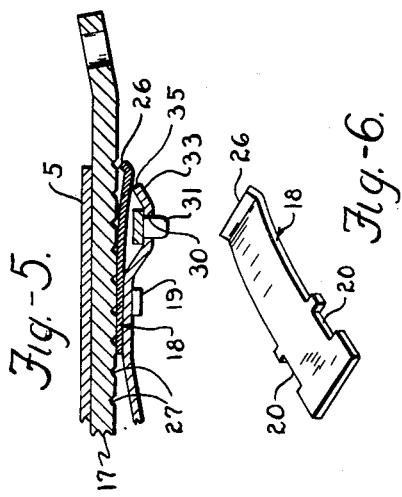
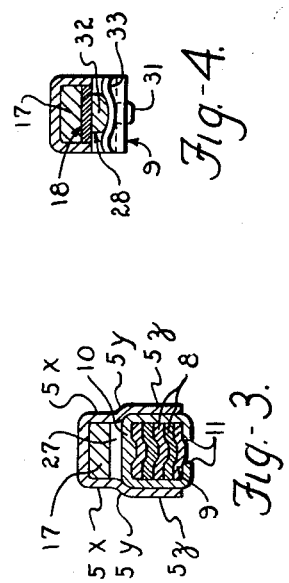
INVENTOR.
THEODORE J. SMULSKI
BY
Charles S. Penfold ATTORNEY Nov. 7, 1950 T. J. SMULSKI 2,528,979
ADJUSTABLE LENGTH WINDSHIELD WIPER ARMS
Original Filed Feb. 11, 1944 2 Sheets-Sheet 2
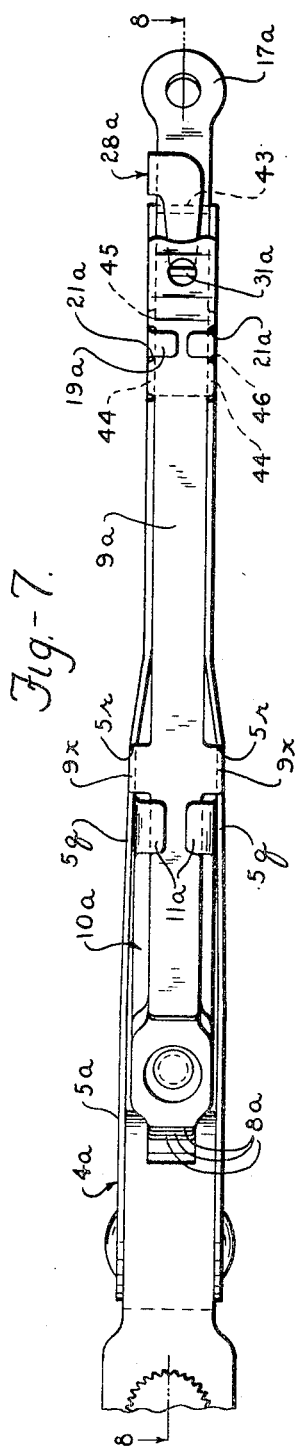
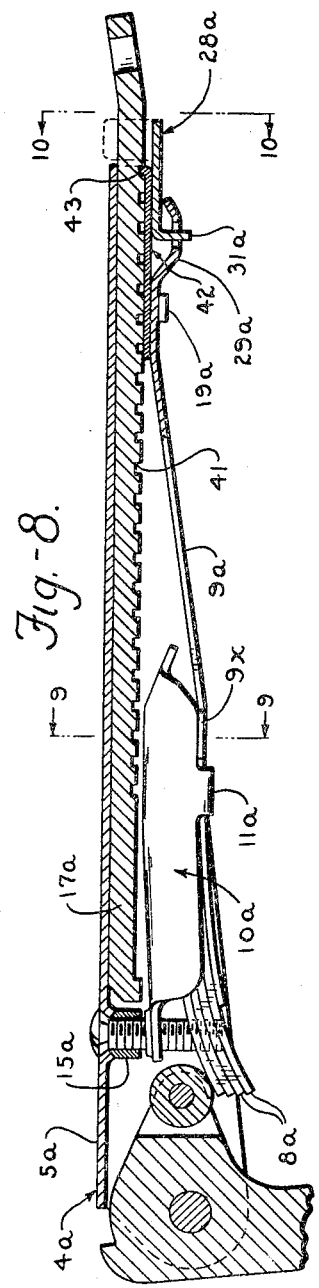
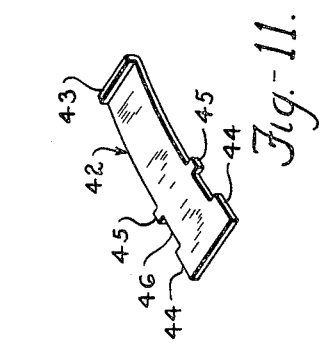
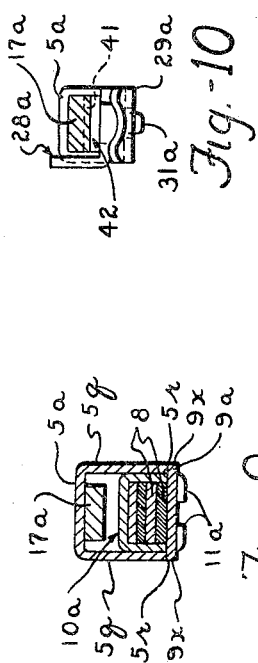
INVENTOR.
THEODORE J. SMULSKI
BY
Charles S. Penfold
ATTORNEY Patented Nov. 7, 1950

2,528,979

UNITED STATES PATENT OFFICE 2,528,979

ADJUSTABLE LENGTH WINDSHIELD WIPER ARMS

Theodore J. Smulski, Gary, Ind., assignor to Productive Inventions, Inc., an Indiana corporation Original application February 11, 1944, Serial No. 521,903. Divided and this application April 5, 1946, Serial No. 659,981

5 Claims. (Cl. 15—250)

1

This invention relates to adjustable length wiper arms for windshield wipers. In wiper arms of this kind supporting and supported arm sections are provided, the supported section being adjustable lengthwise of the supporting section, and the wiper blade being carried by the outer end of the supported section. The means for relatively fixing the sections in different positions of adjustment have been of two classes.

In wiper arms of the first class the supported section is formed with a series of notches and the supporting section with a non-releasable spring detent for engaging the notches. This arrangement has the advantage that there is no tendency of the arm sections to creep, under the influence of centrifugal force and the impact of repeated vibrational shocks, and thereby to extend the arm to an effective total length greater than that for which it was intended to be set. It has the disadvantage, however, that the detent spring must be made fairly stiff and strong in order to prevent slipping. There is no relaxation of the pressure of the detent for adjustment purposes, and hence the operator is required to overcome the full normal holding force of the detent in order to effect a desired adjustment.

This is an especially disadvantageous mode of operation in aircraft wipers. The high velocity of aircraft increases the rate of deposit of precipitation upon the windshield and makes a relatively high speed of wiper operation desirable. The high relative air speed makes it desirable to bias the wiper blade against the aircraft windshield with heavy pressure as compared with the biasing pressure employed in surface vehicle installations. Both these considerations dictate the use of relatively powerful wiper motors in aircraft, so that the forces to which aircraft wiper arms are subjected are increased all round as compared with surface vehicle wiper arms. The normal holding force employed in aircraft installations for securing the wiper arm sections in adjusted relation must, therefore, be very substantial.

Other factors which weigh against wiper arms of this class are that the operator is likely to be in an awkward position for exerting any substantial force when undertaking to make an adjustment, and also that he cannot secure a very firm and dependable grip upon the supported section for that purpose. The first of these factors applies with particular force to aircraft installations.

In wiper arms of the second class a friction clamp is provided for securing the supporting and supported sections in desired positions of relative adjustment, the clamp being operable to non-clamping condition for the purpose of facilitating adjustment, and to a clamping condition for the purpose of opposing relative movement of the parts during operation. This arrangement has the advantage that the desired ease of adjustment may be realized.

The employment of frictional clamping, however, is not generally approved by aircraft engineers. It is feared that because of the relatively great forces involved in aircraft wiper operation, and because of the shock and vibration to which aircraft is subject, that the friction clamp may relax its grip momentarily from time to time under the influence of shock, so that there may be a slow and progressive change in the total effective length of the arm in use.

Tests have been conducted by me with wiper arm structures designed to permit creeping for ascertaining what tendencies toward creeping are present and have shown that in some forms of wipers the adjustable section tends to creep outward under the influence of centrifugal force, while in other forms of wipers the adjustable section tends to creep inward in response to various factors such as the lengthwise component of the pressure exerted by the biasing spring, and side forces having longitudinal components which come into play at each reversal of direction of the wiper arm.

The creeping does not depend upon the occurrence of shock and vibration, but it may be promoted by the presence of a very slight lateral play between the relatively adjustable wiper arm sections. As the adjustable section is caused to shift slightly from side to side relative to the supporting section, and is urged inward or outward, it works its way along very gradually by zigzag steps having a relatively large lateral component and a relatively slight longitudinal component, a force multiplying principle coming into play analogous to that of the inclined plane.

The present application is a division of my copending application, Serial No. 521,903, filed February 11, 1944, now Patent No. 2,507,229, May 9, 1950.

The primary object of the present invention is to provide a structure which combines easy adjustment with assured retention of adjusted length.

In accordance with one practical and advantageous illustrative embodiment of the invention, this object is realized by providing notches in the supported section, a detent cooperative therewith, and means normally pressing the detent forcibly into engagement with the notches but operable at the will of the operator to reduce or remove the pressure upon the detent when adjustment is required.

In accordance with another practical and advantageous illustrative embodiment of the invention, the notches of the supported section and the notch engaging portion of the detent are formed with faces substantially at right angles to the lengthwise dimension of the arm, so that the detent becomes in effect a positive locking member.

It is an important feature of the invention, equally applicable to either of the illustrative forms referred to, that the means for pressing the detent and the supported wiper arm section together includes a yieldable resilient element, the means for pressing the detent forcibly into engagement with the adjustable supported section being operable to locking or detaining position even if the detaining portion of the detent be located between successive notches.

The feature of providing a yieldable resilient element in the detent clamping mechanism is important, not only because it saves the time of the workman, but more particularly because it avoids breakage and disabling distortion of parts.

Other objects and advantages will hereinafter appear.

In the drawing forming part of this specification,

Figure 1 is a fragmentary view in rear elevation, partly broken away, of a windshield wiper arm embodying features of the present invention;

Figure 2 is a fragmentary view in longitudinal section of the structure illustrated in Figure 1, the section being upon the line 2—2 of Figure 1 looking in the direction of the arrows;

Figure 3 is a sectional view taken upon the line 3—3 of Figure 2 looking in the direction of the arrows;

Figure 4 is a sectional view taken upon the line 4—4 of Figure 2 looking in the direction of the arrows;

Figure 5 is a fragmentary sectional view taken upon the line 5—5 of Figure 1 looking in the direction of the arrows;

Figure 6 is a detail perspective view of a supporting and guiding plate illustrated in Figures 1, 2, and 5;

Figure 7 is a fragmentary view in rear elevation of another windshield wiper arm embodying features of the invention;

Figure 8 is a longitudinal sectional view taken substantially on line 8—8 of Figure 7;

Figure 9 is a fragmentary view in transverse section of the structure illustrated in Figure 8, the section being taken upon the line 9—9 of Figure 8, looking in the direction of the arrows;

Figure 10 is a fragmentary sectional view taken upon the line 10—10 of Figure 8 looking in the direction of the arrows; and Figure 11 is a perspective view of a modified form of a supporting and guiding plate.

In Figures 1 to 6, inclusive, disclosure is made of a windshield wiper arm and parts thereof, which is easily adjustable as to length, but in which retention of adjusted length may be assured. The illustrative arm is desirably of the kind illustratively disclosed in Letters Patent of the United States No. 2,326,402, granted to me on August 10, 1943, for Windshield Wiper Arms.

The arm 1 comprises an inner arm section 2 which is rigidly and firmly secured to an actuating shaft 3. The actuating shaft may be oscillated manually or through the operation of a power motor.

A second wiper arm section 4 comprising a channeled member 5 is pivotally mounted upon section 2 through the medium of a cross pin or rivet 6 which is passed through the section 2 and through end portions of the channel walls of the member 5. The wiper section 4 is yieldingly biased toward the windshield by means of an adjustable spring unit 7 and associated parts.

The spring unit comprises a series of leaves 8 which are bound together at their outer ends in fixed relation to one another, being held assembled together with a back cover spring 9 by a channeled rigid holder 10. Ears 11 are folded in from the side walls of the member 10 to clamp a portion of the spring 9 and the outer ends of the leaves 8 in fixed relation to one another and to the holding member. The inner end of the spring assembly formed by the leaves 8 bears against a roller 12 which is rotatively mounted on a cross pin 13 which forms part of the wiper arm section 2.

A screw 14 having its head formed with a screwdriver slot has its shank and body passed through an opening in the front wall of channel member 5 and through a spacing collar 15, the body of the screw being threaded through an ear 16 formed on the inner end of the member 10. Turning of the screw 14 to draw the ear 16 toward the front wall or base of the channel member 5 increases the bias with which the section 4 is urged rearwardly toward the windshield.

The structure just described differs from the disclosure of Patent No. 2,326,402 in one significant feature. The member 10 has no rocking ears for bearing against the front or base wall of the channel member 5, but is instead supported and spaced from the front or base wall by the side walls of the channel member 5. Thus the side wall of member 5 may be made to define a channel adjacent the front wall thereof which is unobstructed and of uniform width from the outer end of the member 5 all the way inward to the screw 14 and the collar 15. This provides a uniform, clear channel for a lengthwise adjustable wiper arm section which will be more particularly referred to and described presently. This manner of support for the member 10 is clearly illustrated in Figure 3 in which the channel side walls of member 5 are shown as comprising forward parallel portions 5x, rearwardly divergent, shoulder forming portions 5y, and rear parallel portions 5z. The member 10 bottoms against, and rocks upon the shoulder forming portions 5y.

The channeled wiper arm section 4 constitutes a supporting section for carrying a lengthwise adjustable, supported wiper arm section 17. The wiper arm section 17 is in the form of a relatively broad and thin bar which is telescopically received in the channel member 5 of supporting section 4, being adjustable lengthwise thereof. The arm section 17 is slidingly supported and guided between the front wall of channel member 5 and a notched guide plate 18 which, together with the channeled member 5 forms a guiding throat for the adjustable section 17.

The plate 18 is disposed at the rear of section 17 and rests in cutouts formed in the rear margins of the side walls of channel member 5. Fingers 19 which extend rearward from the side walls of channel member 5 are received in the notches 20 of the guiding and retaining plate 18 and in notches 21 formed in a broadened portion of the spring 9. The fingers 19 are folded inwardly against the rear face of the spring 9 to retain the channeled member 5, the plate 18, and the spring 9 in fixed relation to one another. The plate 18 is normally slightly bowed and yieldable and does not bear with substantial pressure against the wiper arm section 17, but provides a substantially free passage therefor. Plate 18 serves not only as a guiding and retaining member, but also as a stop for cooperating with a shoulder 22 formed near the inner end of arm section 17, for positively preventing complete separation of the section 17 from the section 4.

One extremity of the plate 18 is provided with a wedge-shaped nose or detent 26 which is adapted to be lodged selectively in any one of a multiplicity of notches 27 formed at desired intervals in the rear face of wiper section 17.

The detent 26 is normally pressed forcibly forward against the member 17 by a wedging semaphore lever 28 whose construction and support desirably correspond to the construction and support of the corresponding parts disclosed and claimed in my Patent No. 2,350,134, dated May 30, 1944, for Extensible Wiper Arms.

The construction and mounting of the lever 28 are briefly as follows. The outer end of the spring 9 is formed with a bowed or arched portion 29 and has a circular opening 30 formed in the keystone portion of the arch. The semaphore lever 28 includes a rearwardly extending tail portion 31 which passes rearwardly through the opening 30. The lever 28 includes a wedging body portion 32 which cooperates with a cam portion 33 of the spring 9 and with the detent 26. The lever also includes an operating finger piece 34 which extends in a fore and aft plane substantially at right angles to the plane of the portion 32.

When the semaphore lever 28 is operated to the position illustrated in Figure 1, it extends in alignment with the wiper arm and is inconspicuously located as viewed from the driver's seat. It is retained in this position by a notch 35 formed in the extremity of the spring 9, and it is caused by the spring to bear forcibly against the plate 18 for strongly resisting a rearward displacement of the plate far enough to permit the nose or detent 26 to clear a notch of the member 17 in which it is received. This is the normal operating condition of the parts, and with the detent or nose thus clamped in a notch of the member 17, the maintenance of the desired lengthwise adjustment of the arm is assured. The effect of shock or vibration will be rather to assure the centering of the nose in the notch rather than the withdrawal of the nose from the notch.

When it is desired to adjust the effective length of the arm, the semaphore lever 28 is operated from the full line position illustrated in Figure 1 to the dotted line position illustrated in that figure. In the latter position the lever 28 extends conspicuously to one side of the wiper arm as viewed from the driver's seat, serving as a conspicuous warning that the lever is in the unlocking position and that the lengthwise adjustment of the wiper arm is not fixed. In this unlocking position, the lever 28 is moved out from under the cam portion 33 of spring 9 and extends in the space between opposite walls of the spring arch. It is retained in this position by engagement with the arch walls, but exerts no important pressure against the detent.

The outer extremity of the plate carrying the detent 26 springs slightly outward when the pressure of the lever 28 against it is relieved. It can, however, be freely cammed aside when the arm section 17 is pulled or thrust to adjust the effective length of the arm, so that the detent offers no substantial resistance to such lengthwise adjustment.

When the desired adjustment has been effected or substantially effected, the lever 28 is returned to the full line position illustrated in Figure 1 to lock the parts in the selected adjusted relationship. While the lever 28 can be more readily returned to the locking position if the nose 26 directly enters a notch 27, the operation of the lever to the locking position is not prevented by engagement of the nose with a raised surface between two adjacent notches, nor is any damage done by forcing the lever to locking position. The spring 9, though stiff, is resilient and sufficiently yieldable to permit such operation without injury to the parts. When the lever is so operated the lever and detent serve to clamp the parts frictionally in place with a very firm pressure, but still there may be a relative creep. Such creeping, however, will in no event extend beyond the point at which the detent nose first encounters a notch. In other words, the creeping will be limited to a fraction of the distance between adjacent notches and the retention of the parts in substantially the relative positions in which they were adjusted will, therefore, be assured.

In Figures 7 to 11, inclusive, another form of construction embodying the invention is illustrated. Since the parts are in the main duplicates of the parts illustrated in Figures 1 to 7, inclusive, corresponding reference characters have been applied to corresponding parts with the subscript "a" added in each instance, and the detailed description of these parts will not be repeated. The ensuing description will be confined to those parts in Figures 8 to 11 which are specifically different from the corresponding parts of Figures 1 to 7.

The adjustable wiper arm section 17a is formed with square notches 41 and a holding member 42 is provided with a square nose 43 for cooperation with the square notches. The inner end of the holding member 42 is provided with projections 44 and 45 which rest in notches formed in the rear margins of the side walls of channel member 5a. The projections 44 and 45 are separated by a notch 46 through which fingers 19a of the side wall members extend. The fingers also extend through notches 21a of the spring 9a and are folded down against the rear face of the spring 9a to hold the channel member 5a, the spring 9a and the inner end of the holding member 42 fixedly in place.

Because the square notches and the square nose form an absolutely positive locking means, so that the notches have no capacity to cam the nose to one side, the holding member is made of spring material which has the tendency normally to spring rearward and carry the nose 43 out of an associated notch 41. The term "square" as herein used includes a configuration having four equal angles which may be a square or rectangle. The semaphore lever 28a comprises the same parts as the lever 28 and is mounted in the same manner in an arched portion 29a of spring 9a that the lever 28 is mounted in the arched portion 29 of spring 9.

When the parts are in the positions illustrated in Figures 8 and 9, the lever 28a maintains the nose 43 of the holding member 42 in a notch 41 with sufficient force to absolutely preclude all possibility of accidental dislodgment. When the lever 28a is operated to unlocking position, the holding member 42 springs rearward, causing the nose 43 to clear the rear face of the member 17a. The member 17a may then be freely adjusted and the lever 28a restored to locking position.

As in the case of the structure illustrated in Figures 1 to 7, it is not necessary that the nose 43 engage in a notch 41 in order for the lever 28a to be fully operated to locking position. As in the former case, if the nose 43 comes to bear upon a raised surface in a space between notches, there will be no relative creeping of the parts beyond the point where an adjacent notch has been shifted into registration with the nose.

As soon as this condition of registration occurs, the nose 43 will be forced to enter the notch and all further disturbance of the lengthwise adjustment of the parts will be positively precluded.

The construction of the channeled member 5a and the mounting of the spring unit 10a upon the channel member are specifically different from the corresponding features of Figures 1 to 7. The channeled member 5a is formed with straight side walls 5q, and the unit 10a is supported rearwardly of the adjustment path of supported section 17a by the rear cover spring 9a. The rear cover spring 9a is formed with laterally projecting ears 9x which bear in notches 5r formed in the rear faces of the side walls 5q. The ears and notches are located closely adjacent to the point of connection of the rear cover spring to the spring unit 10a. The ears bear against rearwardly facing surfaces of the side walls 5q and restrain the spring unit against bodily movement in a forward direction. By reason of the engagement of the ears in the notches, movement of the spring unit 10a lengthwise of the arm is substantially precluded. Adjusting operation of the spring unit 10a into obstructing relation to the adjustment path of the supported section 17a is precluded by the stop collar 15a.

I have described what I believe to be the best embodiments of my invention. I do not wish, however, to be confined to the embodiments shown, but what I desire to cover by Letters Patent is set forth in the appended claims.

I claim:

1. In a windshield wiper, in combination, a supporting section, a supported section carried thereby with capacity for longitudinal adjustment relative thereto, a spring unit carried by the supporting section for engagement with a still further wiper arm section upon which the supporting section is carried, to bias the supporting and supported sections toward a windshield, means carried by the supporting section for adjusting the spring unit to alter the spring bias, said supporting section including a front body member and side walls disposed rearwardly thereof, the side walls including forward portions adjacent the front body member for defining with the front member a continuous channel for the reception of the supported wiper arm section, said side walls engaging and sustaining the spring unit rearwardly of said channel and preventing operation of the spring unit into a channel obstructing position, and rear portions more widely spaced than the forward portions, between which the spring unit is substantially contained.

2. A windshield wiper structure adapted for use in a wiper arm which comprises a first inner section adapted to be affixed forwardly of a windshield to an operating shaft and including an abutment, a second next outer channeled section pivotally mounted on the first section for movement about an axis transverse to the shaft axis, and a third section mounted in the channeled second section with capacity for adjustment longitudinally thereof, said windshield wiper structure comprising, in combination, the channeled second section referred to, said second section including a front body member and rearwardly projecting side walls, a spring unit carried by said channeled section, said spring unit comprising a forward leg and a rear leg united to one another through their outer ends but separable by virtue of spring flexure throughout at least the major portion of their lengths, the inner end of the rear leg being engageable with the abutment of the inner wiper arm section from the rear and being adapted to be limited in its approach toward the front body member of the second wiper arm section by its engagement with said abutment, and adjusting means operatively connecting the inner end of the forward leg of the spring unit with an inner end portion of the front body member of the second wiper arm section, and operable when the second section is operatively installed to force the free inner end of the forward leg of the spring unit progressively toward said front body member, thereby to increase the separation of the forward and rear legs against increasing spring resistance as the forward leg is adjusted forward toward the front body member, the side walls of said channeled second section including forward parallel portions adjacent the front body member for defining with the front body member a continuous guide channel for the reception of the third wiper arm section, intermediate shoulder forming portions engaging the forward leg of the spring unit for rockingly sustaining said leg and preventing its operation into a channel obstructing position, and rear portions more widely spaced than the forward portions, between which the spring unit is substantially contained.

3. In a windshield wiper, in combination, a supporting section, a supported section carried thereby with capacity for longitudinal adjustment relative thereto, an adjustable spring unit carried by the supporting section for biasing the supporting and supported sections toward a windshield, means for adjusting the spring unit to alter the spring bias, said supporting section including a front body member and side walls disposed rearwardly thereof, the forward portions of the side walls adjacent the front body member defining with the front body member a continuous channel for the reception of the supported wiper arm section, said side walls extending rearwardly substantially beyond the adjustment path of the supported section, and a rear cover spring affixed to said side walls and to said spring unit, said cover spring including portions adjacent the point of connection with the spring unit which bear against the side walls, operatively to support the spring unit in rear of the adjustment path of the supported section.

4. In a windshield wiper, in combination, a supporting section, a supported section carried thereby with capacity for longitudinal adjustment relative thereto, an adjustable spring unit carried by the supporting section for biasing the supporting and supported sections toward a windshield, means for adjusting the spring unit to alter the spring bias, said supporting section including a front body member and side walls disposed rearwardly thereof, the forward portions of the side walls adjacent the front body member defining with the front body member a continuous channel for the reception of the supported wiper arm section, said side walls extending rearwardly substantially beyond the adjustment path of the supported section, and a rear cover spring affixed to said side walls and to said spring unit, said cover spring including projections adjacent its point of connection with the spring unit which interfit with the side walls and bear against rear edges thereof, operatively to support the spring unit in rear of the adjustment path of the supported section, and spacer means for preventing operation of the spring unit into the adjustment path of the supported section.

5. A windshield wiper arm structure comprising an inner section adapted for connection to an operating shaft, a channel having a base wall and side walls, said channel also having an inner extremity pivotally connected to the inner section, an extensible outer section seated in the channel and having means at its end for attaching a wiper unit thereto, adjustable actuating means provided with an end for engaging the side walls of the channel at a point intermediate the extremities of said channel whereby to provide clearance for the movement of said extensible outer section, and a spring device operatively connected to the inner section having a part anchored against movement with respect to the channel and a part actable on said actuating means to cause its said end to engage the side walls of the channel.

THEODORE J. SMULSKI.

REFERENCES CITED

The following references are of record in the file of this patent:

UNITED STATES PATENTS

| Number | Name | Date |
| --- | --- | --- |
| 2,245,244 | Zaiger | June 10, 1941 |
| 2,326,402 | Smulski | Aug. 10, 1943 |
| 2,332,660 | Mussen | Oct. 26, 1943 |